United States Patent
Cherchali et al.

(10) Patent No.: US 9,124,474 B2
(45) Date of Patent: Sep. 1, 2015

(54) TECHNIQUE FOR AUTOMATED MAC ADDRESS CLONING

(75) Inventors: Ali Cherchali, Jackson, NJ (US); Marius J. Gudelis, Jr., Holmdel, NJ (US); William G. Lester, Cranford, NJ (US); Robert J. McLaughlin, Allentown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 430 days.

(21) Appl. No.: 12/833,296

(22) Filed: Jul. 9, 2010

(65) Prior Publication Data

US 2010/0274917 A1    Oct. 28, 2010

Related U.S. Application Data

(63) Continuation of application No. 12/011,751, filed on Jan. 29, 2008, now Pat. No. 7,787,455, which is a continuation of application No. 11/033,930, filed on Jan. 12, 2005, now Pat. No. 7,342,925.

(60) Provisional application No. 60/631,633, filed on Nov. 30, 2004.

(51) Int. Cl.
   *H04L 29/12* (2006.01)

(52) U.S. Cl.
   CPC ...... *H04L 29/12216* (2013.01); *H04L 29/1282* (2013.01); *H04L 29/12584* (2013.01); *H04L 29/12839* (2013.01); *H04L 61/2015* (2013.01); *H04L 61/2596* (2013.01); *H04L 61/6013* (2013.01); *H04L 61/6022* (2013.01)

(58) Field of Classification Search
   None
   See application file for complete search history.

(56) References Cited

U.S. PATENT DOCUMENTS

| | | | |
|---|---|---|---|
| 6,223,222 B1 * | 4/2001 | Fijolek et al. | 709/227 |
| 6,577,642 B1 * | 6/2003 | Fijolek et al. | 370/465 |
| 6,657,991 B1 * | 12/2003 | Akgun et al. | 370/352 |
| 6,847,704 B1 | 1/2005 | Cherchali et al. | |
| 7,068,597 B1 | 6/2006 | Fijolek et al. | |
| 7,139,818 B1 | 11/2006 | Kinnear et al. | |
| 7,143,137 B2 * | 11/2006 | Maufer et al. | 709/205 |
| 7,263,559 B2 * | 8/2007 | Yao et al. | 709/230 |
| 7,342,925 B2 | 3/2008 | Cherchali et al. | |
| 7,508,816 B1 * | 3/2009 | Everson et al. | 370/352 |
| 7,787,455 B2 | 8/2010 | Cherchali et al. | |
| 2002/0006137 A1 * | 1/2002 | Rabenko et al. | 370/466 |
| 2002/0062485 A1 * | 5/2002 | Okano et al. | 725/111 |
| 2002/0141389 A1 * | 10/2002 | Fangman et al. | 370/352 |
| 2003/0133450 A1 * | 7/2003 | Baum | 370/389 |
| 2003/0147395 A1 * | 8/2003 | Gutknecht et al. | 370/393 |
| 2003/0147404 A1 * | 8/2003 | Mazo | 370/400 |
| 2003/0172170 A1 * | 9/2003 | Johnson et al. | 709/230 |
| 2003/0212773 A1 * | 11/2003 | Sullivan | 709/221 |
| 2003/0212781 A1 * | 11/2003 | Kaneda et al. | 709/223 |
| 2003/0233452 A1 * | 12/2003 | Maufer et al. | 709/225 |

(Continued)

FOREIGN PATENT DOCUMENTS

| | | |
|---|---|---|
| EP | 1119139 | 5/1999 |
| WO | WO 0171983 | 9/2001 |

*Primary Examiner* — Alpus H Hsu
*Assistant Examiner* — Hooman Houshmand

(57) ABSTRACT

In an arrangement where the device that is known to an ISP is communicating with the ISP through an interposed device that is not known to the ISP, the interposed device captures the known device's MAC address upon startup and clones the captured MAC address in all standard packets that it sends to the ISP.

8 Claims, 2 Drawing Sheets

(56) References Cited

U.S. PATENT DOCUMENTS

| | | |
|---|---|---|
| 2004/0073600 A1 | 4/2004 | Elo |
| 2004/0177133 A1* | 9/2004 | Harrison et al. ............. 709/220 |
| 2004/0205211 A1* | 10/2004 | Takeda et al. ................. 709/230 |
| 2004/0219948 A1* | 11/2004 | Jones et al. ................. 455/552.1 |
| 2004/0230970 A1* | 11/2004 | Janzen .......................... 717/174 |
| 2004/0249927 A1* | 12/2004 | Pezutti .......................... 709/223 |
| 2004/0267949 A1* | 12/2004 | Rover et al. ................... 709/230 |
| 2005/0044273 A1* | 2/2005 | Bouchat et al. ............... 709/245 |
| 2005/0047355 A1 | 3/2005 | Wood et al. |
| 2005/0083908 A1* | 4/2005 | Holder .......................... 370/352 |
| 2005/0149204 A1* | 7/2005 | Manchester et al. ............. 700/1 |
| 2005/0149626 A1* | 7/2005 | Manchester et al. .......... 709/220 |
| 2005/0198040 A1* | 9/2005 | Cohen et al. .................... 707/10 |
| 2005/0198233 A1* | 9/2005 | Manchester et al. .......... 709/221 |
| 2005/0201391 A1* | 9/2005 | Ma et al. ....................... 370/401 |
| 2005/0243837 A1 | 11/2005 | Boyd et al. |
| 2006/0168280 A1* | 7/2006 | Alexis ........................... 709/230 |

* cited by examiner

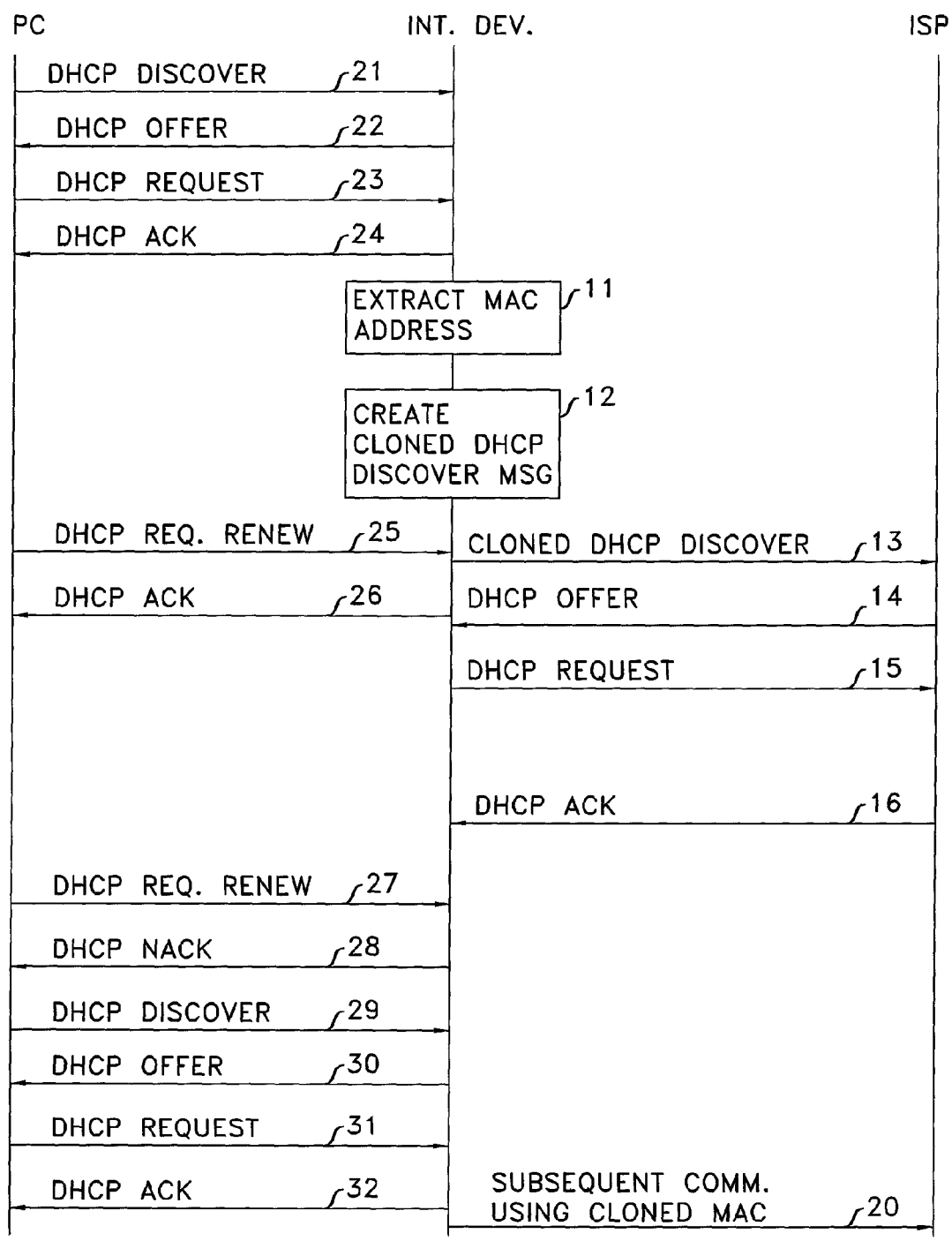

TECHNIQUE FOR AUTOMATED MAC ADDRESS CLONING

RELATED APPLICATIONS

This Application is a continuation of application Ser. No. 12/011,751 filed in the USPTO on Jan. 29, 2008, now U.S. Pat. No. 7,787,455, which application is a continuation of U.S. application Ser. No. 11/033,930, filed Jan. 12, 2005, now U.S. Pat. No. 7,342,945, which claims priority of Provisional Ser. No. 60/631,633 filed Nov. 30, 2004.

BACKGROUND

This invention relates to communication over the Internet, and more particularly to establishing IP addresses for subscriber devices.

Internet Service Providers (ISPs) supply a public IP address upon request to a subscriber's IP device (e.g., PC NIC card). This request is most commonly made at startup of the IP device, when the device sends a Dynamic Host Configuration Protocol (DHCP) Broadcast Discover message, requesting IP Address offers from any DHCP server that is listening. In response to the DHCP Broadcast Discover message one or more DHCP Offer messages are received at the subscriber's IP device, the IP device chooses the offer of one of the responding servers, and sends a DHCP Request message to the chosen server. The chosen server sends back an Acknowledgement (ACK) message, and communication thereafter proceeds.

Cable companies that offer Internet access through cable modems bridge DHCP Discover messages that are received by a modem onto a Data Over Cable System Interface Specification (DOCSIS) channel, where the cable modem identifies itself to a cable modem termination system (CMTS) by providing its Media Access Control (MAC) address. The CMTS thus receives both the DHCP Discover message from an IP device that is connected to the cable modem and the cable modem's MAC address. When a subscriber's IP device, such as a PC, connects to the cable company's ISP server, the cable company can therefore establish a correspondence between the MAC address of the subscriber's cable modem and the MAC address of the subscriber's IP device. Thereafter, knowing the MAC address that is expected to be found in DHCP Discover messages coming from the subscriber's cable modem, a cable company can choose to decline providing an IP address in response to a DHCP Discover message with an unexpected MAC address. Declining to provide an IP address is a measure of security that prevents an interloper's IP device from obtaining service. Consequently, however, when a legitimate subscriber wants to change the IP device or add an interposed device, the subscriber needs to contact the ISP (e.g., by telephone), and have the ISP clear the existing MAC addresses association, so that a new association can be established.

The fact that anytime the subscriber wants to add a new IP end-device such as a new PC, a home-router, or some other device, the subscriber needs to contact the ISP represents a significant inconvenience. A solution is to mimic, or clone, the MAC address of the old device in the new end-device, but this also presents a hassle for the subscriber because currently available devices need to be manually configured to perform such cloning.

SUMMARY

An advance in the art is achieved in an arrangement where the device that is known to the ISP is communicating with the ISP through an interposed device that is not known to the ISP by having the interposed device automatically clone the known device's MAC address in its communications with the ISP. This is achieved by the interposed device capturing the MAC address of the known device at startup and employing the captured MAC address in all standard packets that are sent to the ISP.

BRIEF DESCRIPTION OF THE DRAWING

FIG. 2 presents an alternate messages flow chart.

DETAILED DESCRIPTION

Many ISPs track a user's MAC address as a crude security measure, but the idea of cloning a MAC address has made this security measure more of a hassle than an effective measure. Home Router manufacturers embraced the idea of cloning in order to keep their buyers from having to reset this MAC with the ISP. However, the subscriber has to locate and identify the MAC address of his or her PC, and use this information to manually set up cloning in the router. To a novice this setup can be challenging, and circumventing it would provide a much better customer experience.

The present disclosure relates to an arrangement where a subscriber's PC (or other IP device) has already been configured to work with the ISP, and where the subscriber interposes a new device between the subscriber's PC and the cable modem. Home Routers (HR), Media Terminal Adapters, and Telephone Adapters are examples of such interposed devices, each possessing its own MAC address.

Although interposed devices have their own MAC addresses, to meet the objective of this invention an interposed device needs to automatically assume the MAC address of the PC that is already known to the ISP's server whenever the interposed device communicates with the ISP server.

Figure 1:
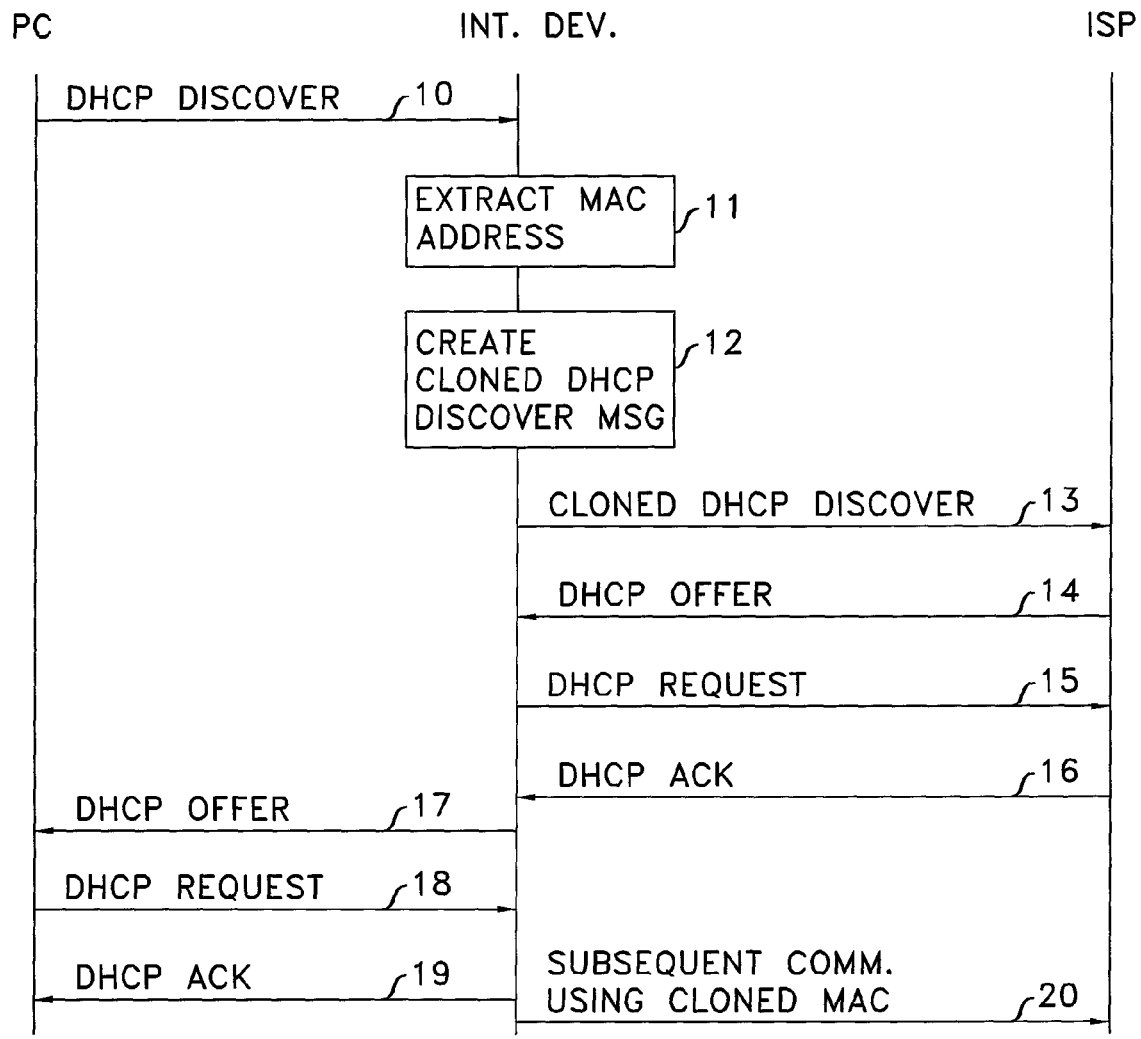
FIG. 1 presents a messages flow chart in accord with the principles disclosed herein.

In accordance with the illustrative approach depicted in FIG. 1, when the user's IP device is powered on at step 10, the TCP/IP interface of the IP device sends out a DHCP Discover message to acquire an IP address. It is a request to receive an IP address by selecting from one or more DHCP Offer messages that might arrive from listening DHCP servers. In step 11 the interposed device captures the DHCP Discover message and extracts therefrom the MAC address. In step 12 the interposed device creates its own DHCP Discover message, places the MAC address that was extracted from the DHCP Discover message sent by the IP device instead of its own MAC address, and in step 13 forwards the modified DHCP Discover message to the ISP. In step 14 the ISP sends to the interposed device a DHCP Offer message containing a public IP address and a DNS address, in step 15 the interposed device sends a DHCP Request message to the ISP, which effectively confirms its acceptance of the offered IP address, and in step 16 the ISP sends an ACK message, confirming the IP address that will be used. Thereafter, according to step 20 communication proceeds between the interposed device and the ISP, with the continued use of the cloned MAC address. The continued use of the cloned MAC address prevents an ISP from raising an alarm should it choose—in the course of the communication session—to check the MAC address of the device with which it is communicating.

Following step 16, or concurrently therewith, at step 17 the interposed device sends a DHCP Offer message to the subscriber's IP device, offering to the IP device a private IP address, and at steps 18-19 the interposed device and the IP device complete the IP acquisition protocol vis-à-vis the private IP address in the conventional manner described above.

FIG. 2 shows a slightly different approach. Specifically, as soon as the interposed device receives the initial DHCP Discover message in step 21, in step 22 it immediately offers the subscriber's IP device a private IP address, but with no DNS listed. The offer contains a very short lease time; for example, 10 sec. In step 23 the IP device follows up with the DHCP Request (since this is the only offer it received), and the interposed device completes the transaction with a DHCP ACK message in step 24.

The interposed device then turns to its task of establishing a connection to the ISP, extracts the MAC address of the IP device in step 11, creates its own DHCP Discover message with its MAC address replaced with the extracted MAC address of the IP device in step 12, and presents its created DHCP Discover message (with the cloned MAC address) to the ISP in step 13.

In the illustrative signal flow chart of FIG. 2, the lease time for the private IP address provided to the IP device expires shortly after the interposed device sends its created DHCP Discover message to the ISP. When the lease time thus expires, in step 25 the IP device sends a DHCP Request Renew message to the interposed device, asking to renew the lease. Since the interposed device has not yet received an IP address from the ISP, the interposed device sends a DHCP ACK message to the IP device in step 26, renewing the lease for another short interval.

Eventually, the communication between the interposed device and the ISP (steps 14, 15, and 16) completes, and the interposed device is in possession of a public IP address and DNS address. Thereafter, when the IP address lease of the IP device expires again and the IP device sends a DHCP Request Renew message in step 27, the interposed device responds in step 28 with a DHCP NACK message that denies use by the IP device of the previously provided private IP address. Having received a negative acknowledgement message, the subscriber's IP device sends a new DHCP Discover message in step 29, in response to which in step 30 the interposed device sends a DHCP Offer message that is complete with DNS address(es), and the same or a different private IP address. The IP device then sends a DHCP Request message in step 31, and the interposed device responds with a DHCP ACK message in step 32.

Figure 3:
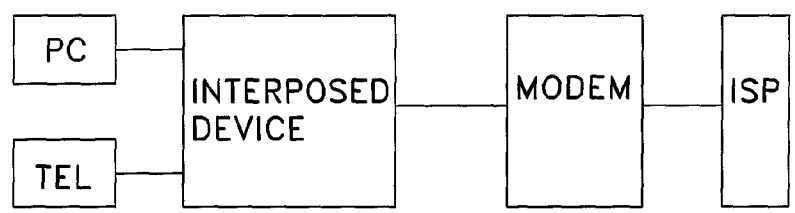
FIG. 3 shows an arrangement of an interposed device that supports both a PC and an IP telephone.

The interposed device can be viewed to have an upstream side that is connected to the ISP through a modem, and a downstream side that is connected to a subscriber's IP device with a MAC address that is known to the ISP. On the upstream side the interposed device behaves like a client relative to the ISP. On the downstream side the interposed device behaves like a server relative to the subscriber's IP device, and any other device that is connected to the interposed device on the downstream side thereof, such as illustrated for example in FIG. 3 where a PC and a telephone are connected to the downstream side of the interposed device. For sake of simplicity, it is assumed that the telephone shown in FIG. 3 is an IP device. Of course, the shown telephone can be a conventional POTS telephone if the circuitry that is necessary for converting it to an IP device is included within the interposed device.

It is noted that the above-disclosed approach requires the PC with the MAC address that is known to the ISP to send a DHCP Discover message to the interposed device before any other of the IP devices that are connected to the downstream side of the interposed device. When this is done, other devices can send their own DHCP Discover message, obtain their own private IP address from the interposed device and communicate in a conventional manner. It is noted, however, that the communication with the ISP, as far as the ISP is concerned, is with the PC that is known to the ISP because, as shown in step 20 of both FIG. 1 and FIG. 2, subsequent communication from the interposed device to the ISP is with packets that employ the cloned MAC address.

The above discloses two illustrative approaches for automatically cloning the MAC address of a device that is known to an ISP, but it should be realized that other approaches can be implemented without departing from the spirit and scope of this invention. To illustrate, the private IP address that is provided to the PC (sans a DNS address) is shown in FIG. 2 to be provided immediately upon receipt DHCP Discover message 21, but it could just as validly be provided sometime later, such as after the MAC address is extracted.

The invention claimed is:

1. A method, comprising:

obtaining, by an interposed internet protocol device, a media access control address from a user internet protocol device, wherein the media access control address is obtained by receiving a first dynamic host configuration protocol discover message that includes the media access control address from the user internet protocol device, wherein the obtaining further comprises extracting the media access control address from the first dynamic host configuration protocol discover message that is received;

receiving, by the interposed internet protocol device, a first dynamic host configuration protocol request message from the user internet protocol device;

sending, by the interposed internet protocol device, a first dynamic host configuration protocol acknowledgement message to the user internet protocol device;

sending, by the interposed internet protocol device to an internet service provider, a second dynamic host configuration protocol discover message that includes a media access control address from a second user internet protocol device that is different from the media access control address that is extracted from the first dynamic host configuration protocol discover message and is different from a media access control address of the interposed internet protocol device, wherein the media access control address from the second user internet protocol device has previously been extracted by the interposed internet protocol device from a third dynamic host configuration protocol discover message from the second user internet protocol device;

receiving, by the interposed internet protocol device from the internet service provider, a first dynamic host configuration protocol offer message based on the media access control address from the second user internet protocol device, the first dynamic host configuration offer message including a public internet protocol address and a domain name system address;

sending, by the interposed internet protocol device, an interim dynamic host configuration protocol offer message that includes a private internet protocol address, a lease time and a blank domain name service address;

receiving, by the interposed internet protocol device, an interim dynamic host configuration protocol request message from the user internet protocol device in response to the interim dynamic host configuration protocol offer message;

sending, by the interposed internet protocol device, a first interim dynamic host configuration protocol acknowledgement message to the user internet protocol device;

providing, by the interposed internet protocol device, a second dynamic host configuration protocol offer message to the user internet protocol device, wherein the interposed internet protocol device connects to the internet service provider via a cable modem;

sending, by the interposed internet protocol device to the internet service provider, a second dynamic host configuration protocol request message that confirms an acceptance of the public internet protocol address; and receiving, by the interposed internet protocol device from the internet service provider, a second dynamic host configuration protocol acknowledgement message, wherein the second dynamic host configuration protocol acknowledgement message that is received from the internet service provider confirms that the internet protocol address will be used by the internet service provider.

2. The method of claim 1, wherein the second dynamic host configuration protocol offer message contains a private internet protocol address and the domain name system address.

3. The method of claim 1 where the interposed internet protocol device is a router.

4. The method of claim 1, where the interposed internet protocol device is a media terminal adapter.

5. The method of claim 1, where the interposed internet protocol device is a telephone adapter.

6. The method of claim 1, further comprising, when the lease time expires prior to the interposed internet protocol device receiving the second dynamic host configuration protocol acknowledgement message:

sending a second interim dynamic host configuration protocol acknowledgement message to the user internet protocol device that provides for a renewed lease time.

7. The method of claim 1, further comprising, when the lease time expires after the interposed internet protocol device receives the second dynamic host configuration protocol acknowledgement message:

sending a dynamic host configuration protocol negative acknowledgment message to the user internet protocol device that denies use of the private internet protocol address that was previously included in the interim dynamic host configuration protocol offer message;

receiving a responsive dynamic host configuration protocol discover message from the user internet protocol device;

sending a final dynamic host configuration protocol offer message to the user internet protocol device;

receiving a responsive dynamic host configuration protocol request message; and sending a final dynamic host configuration protocol acknowledgement message to the user internet protocol device.

8. The method of claim 1, further comprising:

receiving from the user internet protocol device a dynamic host configuration protocol request-to-renew message when the lease time expires.

* * * * *